(12) United States Patent
Hilliard et al.

(10) Patent No.: US 12,505,024 B1
(45) Date of Patent: Dec. 23, 2025

(54) LOW OVERHEAD LOGGING

(71) Applicant: Amazon Technologies, Inc., Seattle, WA (US)

(72) Inventors: George Hilliard, Austin, TX (US); Laura Sharpless, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/617,078

(22) Filed: Mar. 26, 2024

(51) Int. Cl.
*G06F 11/362* (2025.01)
*G06F 8/41* (2018.01)
*G06F 11/34* (2006.01)
*G06F 40/284* (2020.01)

(52) U.S. Cl.
CPC ............ *G06F 11/3476* (2013.01); *G06F 8/41* (2013.01); *G06F 11/348* (2013.01); *G06F 40/284* (2020.01)

(58) Field of Classification Search
CPC ............ G06F 11/3476; G06F 11/3419; G06F 11/3466
USPC ..................................................... 714/37, 45
See application file for complete search history.

(56) References Cited

U.S. PATENT DOCUMENTS

| | | | |
|---|---|---|---|
| 8,327,342 B2 * | 12/2012 | Komatsu ............. | G06F 8/443 717/145 |
| 9,952,863 B1 | 4/2018 | Blasco et al. | |
| 10,725,846 B1 * | 7/2020 | Schreter .................... | G06F 8/73 |
| 2020/0034274 A1 * | 1/2020 | Zinger ................ | G06F 11/3636 |
| 2022/0334963 A1 * | 10/2022 | Patel .................... | G06F 12/0877 |
| 2024/0113986 A1 * | 4/2024 | Koramutla ............. | H04L 67/12 |

FOREIGN PATENT DOCUMENTS

WO     WO-2022029418 A1 *   2/2022    .......... G06F 11/3466

OTHER PUBLICATIONS

ARM® Developer, "Embedded Trace Macrocell™ Architecture Specification: ETMv1.0 to ETMv3.5," Sep. 23, 2011, ARM IHI 0014Q, ID101211, Sections 1.1, 1.1.1, and 1.1.2, pp. 16-18, URL: https://developer.arm.com/documentation/ihi0014/q/Introduction/About-Embedded-Trace-Macrocells.

The Pigweed Authors, "pw_log_tokenized," Dec. 4, 2023, 5 pages, retrieved from the Wayback Machine at URL: https://web.archive.org/web/20231204000110/https://pigweed.dev/pw_log_tokenized/.

* cited by examiner

*Primary Examiner* — Chae M Ko
(74) *Attorney, Agent, or Firm* — Weaver Austin Villeneuve & Sampson LLP (57) ABSTRACT

An integrated circuit (IC) device may obtain machine instructions for a program that include a logging machine instruction to store metadata in a buffer. The IC device may execute the machine instructions for the program, and store the metadata in the buffer upon executing the logging machine instruction. The logging machine instruction may be generated by compiling code for storing the metadata into a single machine instruction. The metadata may include an instruction pointer maintained by the IC device, and a timestamp indicating a time of execution of the logging machine instruction.

20 Claims, 5 Drawing Sheets

LOW OVERHEAD LOGGING

BACKGROUND

Logging information during a software development process can be used to identify and fix bugs, and/or to assess and improve performance of a software application. However, in most cases, logging information may involve a high overhead, since logging large amounts of data during runtime may have a large memory footprint, and may also slow down the program execution.

BRIEF DESCRIPTION OF THE DRAWINGS

Various embodiments in accordance with the present disclosure will be described with reference to the drawings, in which.

DETAILED DESCRIPTION

Some approaches for logging information during execution of a software program may include copying log strings (e.g., similar to a printf style string) into a buffer, which may consume large amounts of memory and slow down the execution of the program. For example, debug code may be inserted into the program code to copy the log strings at different times during the execution. The debug code may compile into multiple load and store instructions, which may result in multiple machine instructions being executed for each log string. Furthermore, copying a full log string can take up excessive memory and compute resources. Some improvements to this approach may use tokenized logging where the program does not copy the entire string, but emits a token and some additional metadata, which can be used to reconstruct a corresponding log message at a later time. The tokenized logging may reduce the local memory usage due to the small sizes of the tokens that are stored in comparison to the log strings.

Some approaches may include using additional hardware to passively observe the state of the system (e.g., tracing devices) without any runtime overhead. However, the tracing devices can be difficult to integrate into a development workflow. Furthermore, simply enabling tracing may generate large volumes of tracing data that may need to be processed to retrieve useful information, and, therefore, can be a resource intensive task.

Techniques described herein can provide a low overhead logging mechanism that uses single machine instructions to automatically capture metadata associated with a program during runtime into a software configurable buffer, which can be used by a post-processor program to generate corresponding program logging strings. In some embodiments, program code for the program can be modified to include code for storing the metadata in a buffer at different times during execution of the program on an IC device. As used herein, the code for storing the metadata may include one or more code statements based on the given programming language. Each instance of the code for storing the metadata may be compiled into a corresponding single machine instruction, and each single machine instruction may store corresponding metadata into the buffer upon execution. The metadata stored from execution of each machine instruction may include an instruction pointer (or program counter) maintained by the IC device, a timestamp indicating a time of execution of the corresponding machine instruction, and optional data associated with the program. The data associated with the program may be generated during the execution of the program, and may include register contents, memory contents, or any suitable value that can be used for analysis of the program.

The post-processor may use the program code and the stored metadata to reconstruct corresponding log messages or strings to be emitted to a program developer (or a user). The program code may be modified by the program developer to include the logging code, which can provide flexibility while retaining program control of when the log messages are emitted. The post-processor may also perform offline analysis of the program using the instruction pointer as a unique token to collect other relevant information associated with the program. Furthermore, the captured timestamps can be useful in a variety of contexts. For example, a logging instruction may be inserted in the beginning and end of each function of interest in the program to emit corresponding function start and end notifications, which can be used to build a flame chart or other visualization of the program execution. The processed data may also be used for profile guided optimization of the program.

Thus, instead of adding additional hardware to observe the state of the system, the program itself can be modified to include programmer-controlled logging, which may get translated to single machine instructions that automatically capture relevant information associated with the program. The techniques described herein can combine the flexibility of programmer-controlled logging with the reduction in size of tokenized logging and the low overhead of tracing by reducing the overhead of logging all the way to a single machine instruction, while retaining program control to provide program progress notifications.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
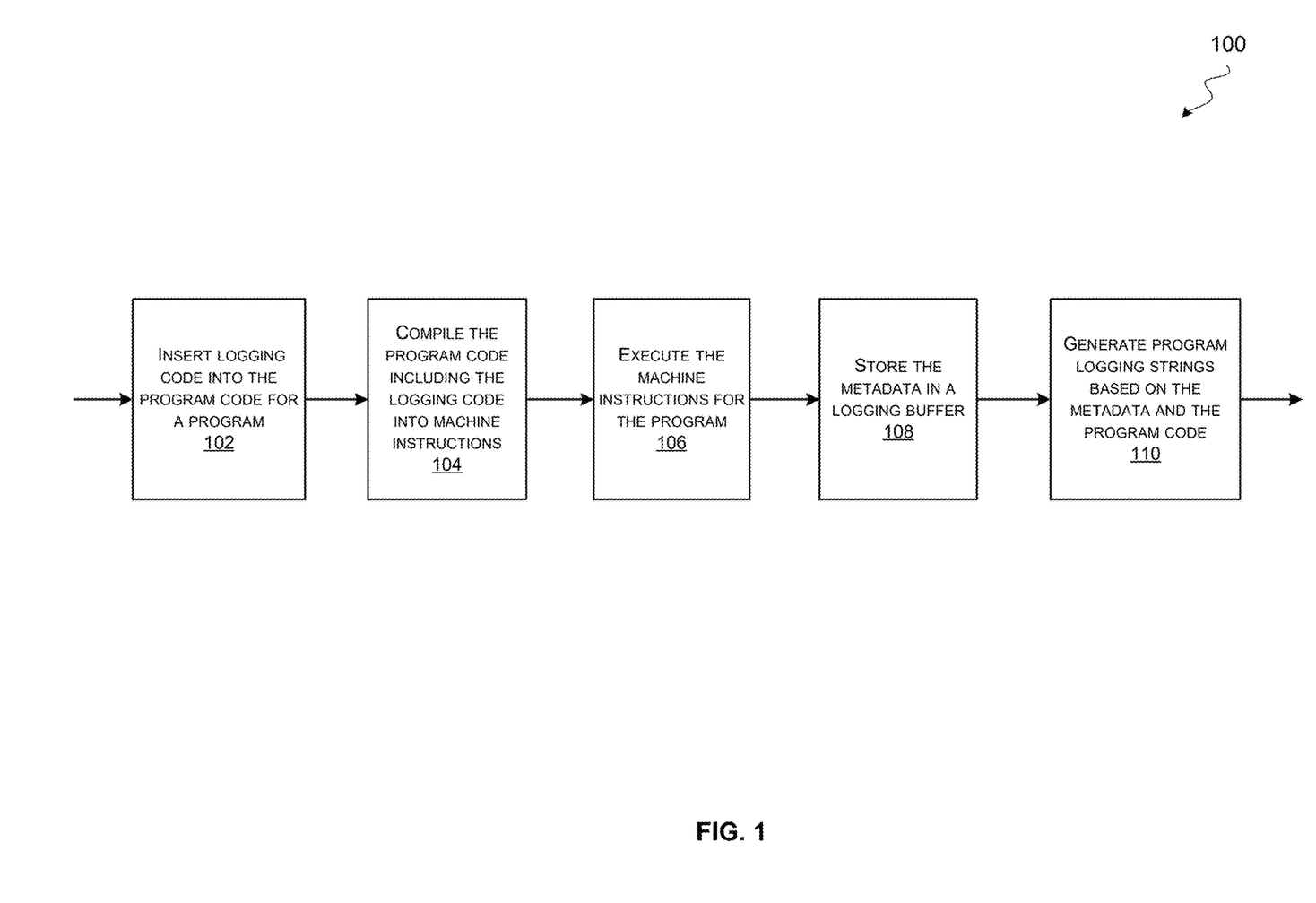
FIG. 1 illustrates an example of a process that can be used to generate logging strings for analyzing a program with low overhead, according to some embodiments.

FIG. 1 illustrates an example of a process 100 that can be used to generate logging strings for analyzing a program with low overhead, according to some embodiments.

At block 102, the process 100 may start by inserting logging code into the program code for a program to be executed on an IC device. The logging code may correspond to the code comprising one or more code statements for storing the metadata associated with the program in a logging buffer at different times during execution of the program. In some examples, the program code may be modified by a program developer or a user to insert the logging code in desired locations of the program code for debugging or tracing the program, or to provide program progress notifications. As an example, the logging code can be automatically inserted by the process 100 before and after each function and/or sub-function of interest in the program to obtain a complete view of the program, e.g., timings of execution for each function/sub-function, which can be used to build a view of the hot spots for the program without impacting the overall performance of the program.

At block 104, the process 100 may use a compiler to compile the program code including the logging code into machine instructions. The compiler is operable to receive the program code for a program that includes the logging code to be executed on the IC device, and compile the program code into the machine instructions. The logging code may include the code for storing the metadata, and can be inserted at different times in the program. Each instance of the logging code can be compiled into a corresponding single machine instruction.

At block 106, the IC device may execute the machine instructions for the program. The metadata stored by each single machine instruction may include an instruction pointer maintained by a processor of the IC device, a timestamp indicating a time of execution of the corresponding single machine instruction, and data associated with the program at that time. Since the machine instructions include single machine instructions corresponding to the logging code inserted in the program code for the program, there is minimal increase in the program size as compared to the techniques that insert debug code comprising multiple load and store instructions. This also reduces the impact on the execution time of the program.

At block 108, the IC device may store the metadata in the logging buffer at each of the different times upon executing the corresponding single machine instruction. Thus, the blocks 106 and 108 may be executed in parallel. The IC device may store the metadata in the logging buffer automatically upon execution of the corresponding log instruction with minimum logging overhead. In some embodiments, the logging buffer can be part of the IC device. In some embodiments, the logging buffer can be an external memory of the IC device. The logging buffer may be mapped to a memory region that is not used by the normal execution of the program, and, therefore, does not interfere with the execution of the program.

At block 110, a post-processor may be used to generate program logging strings based on the stored metadata and the program code. The post-processor may also be operable to perform offline analysis of the program surrounding the instruction pointer. In some implementations, the post-processor may operate as a detokenizer to reconstruct the logging strings using the instruction pointer as a token, and a token database or a library that can be used for mapping the tokens to the corresponding logging strings.

Figure 2:
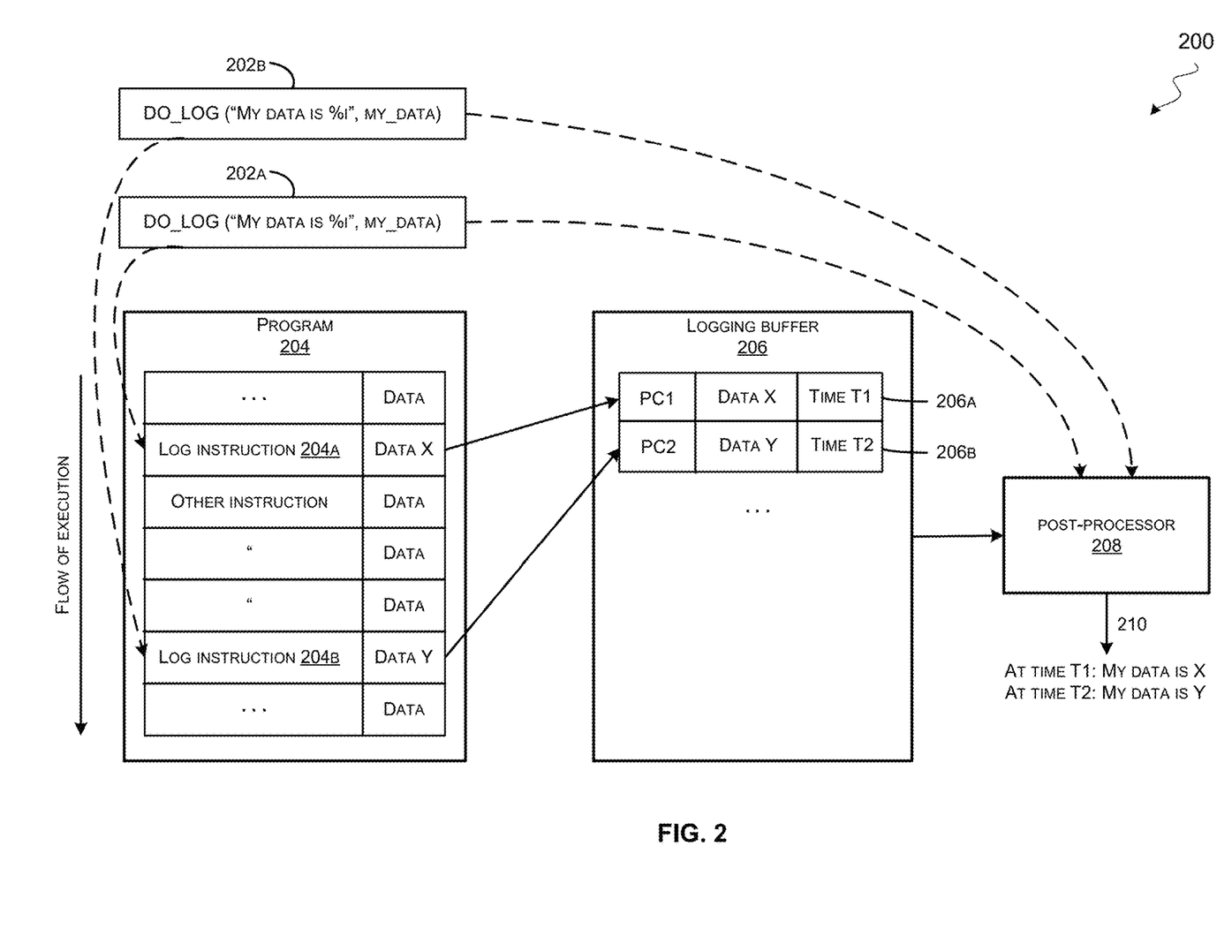
FIG. 2 illustrates an example view of the low overhead logging mechanism for an integrated circuit (IC) device, according to some embodiments.

FIG. 2 illustrates an example view 200 of the low overhead logging mechanism for an IC device, according to some embodiments.

The IC device can be, or include a processor, a hardware accelerator (e.g., a neural network accelerator, a crypto engine, a graphics processing unit (GPU), etc.), a microcontroller, a network controller, or any suitable integrated circuit. In some examples, the IC device can be implemented using a system-on-chip (SoC), or a field programmable gate array (FPGA). In some embodiments, the IC device may include a processor configured to execute instructions stored in a computer readable medium. In some embodiments, the IC device may include an execution unit that may be operable to maintain an instruction pointer or a program counter (PC) to manage fetching and execution of the instructions. In some implementations, the PC may be a register in the processor that holds a memory address of the next instruction to be executed.

FIG. 2 shows an example of a flow of execution of a program 204 on the IC device. The program code for the program 204 may include code for storing metadata associated with the program 204 at different times of execution of the program. As described in the block 102, logging code comprising do_log code 202a and do_log code 202b may be inserted in the program code for storing metadata at different times of execution of the program 204. Each of the do_log code 202a and the do_log code 202b may include one or more code statements based on the given programming language. As described in the block 104, a compiler may be used to compile the program code into machine instructions that include a single log instruction 204a and a single log instruction 204b corresponding to the do_log code 202a and the do_log code 202b, respectively. In some implementations, the compiler may have access to tokenized logging libraries to enable the generation of single machine instructions for each log instruction.

In various examples, the do_log code may be inserted in multiple locations of the program code by a program developer for code profiling, debugging, or tracing the program. For example, the do_log code 202a may be inserted before a snippet of the program code, and the do_log code 202b may be inserted after the snippet of the program code to obtain an execution time for the snippet of the program code. Thus, as shown in FIG. 2, the program 204 may include machine instructions corresponding to the snippet of the program code that include the log instructions 204a and 204b, respectively, before and after other instructions associated with the snippet of the program code.

As described in the block 106, the IC device may execute the machine instructions for the program 204 that include the log instructions 204a and 204b. Executing the log instructions 204a and 204b may cause storing metadata 206a and metadata 206b in a logging buffer 206, as described in the block 108. The metadata 206a may include a timestamp T1 indicating a time of execution of the log instruction 204a, and a current value PC1 of the instruction pointer, and an optional data X associated with the program 204 at the time T1. The metadata 206b may include a timestamp T2 indicating a time of execution of the log instruction 204b, and a current value PC2 of the instruction pointer, and an optional data Y associated with the program 204 at the time T2.

As described in the block 110, a post-processor 208 may use the stored metadata 206a and 206b in the logging buffer 206 and the program code for the program 204 to generate log messages or program logging strings 210. For example, the post-processor 208 may use the metadata 206a and extract information associated with the do_log code 202a from the program code to generate a logging string "At time T1: My data is X" corresponding to the log instruction 204a, and use the metadata 206b and extract information associated with the do_log code 202b from the program code to generate a logging string "At time T2: My data is Y" corresponding to the log instruction 204b. In some examples, the timestamps T1 and T2 may be used to emit start and end notifications for the snippet of program code, which may correspond to a function or a sub-function.

The post-processor 208 may also be operable to perform offline analysis of the program 204 surrounding the instruction pointer. In some examples, the post-processor 208 may use the instruction pointer as a unique token for post-processing, e.g., identify hot spots, or perform code profiling, which can be used for guided optimization of the program or to improve performance. As an example, the post-processor 208 may be able to identify occurrences of different events, and any other information from debugging, or tracing the program. In some implementations, the post-processor 208 may operate as a detokenizer to reconstruct the program logging strings 210 using the instruction pointer as the token, and a token database or a library that can be used for mapping the tokens to the corresponding logging strings. The post-processor 208 may be operable to generate log messages or logging strings in any suitable format desired by the program developer based on a mutually agreeable format of the metadata.

Figure 3:
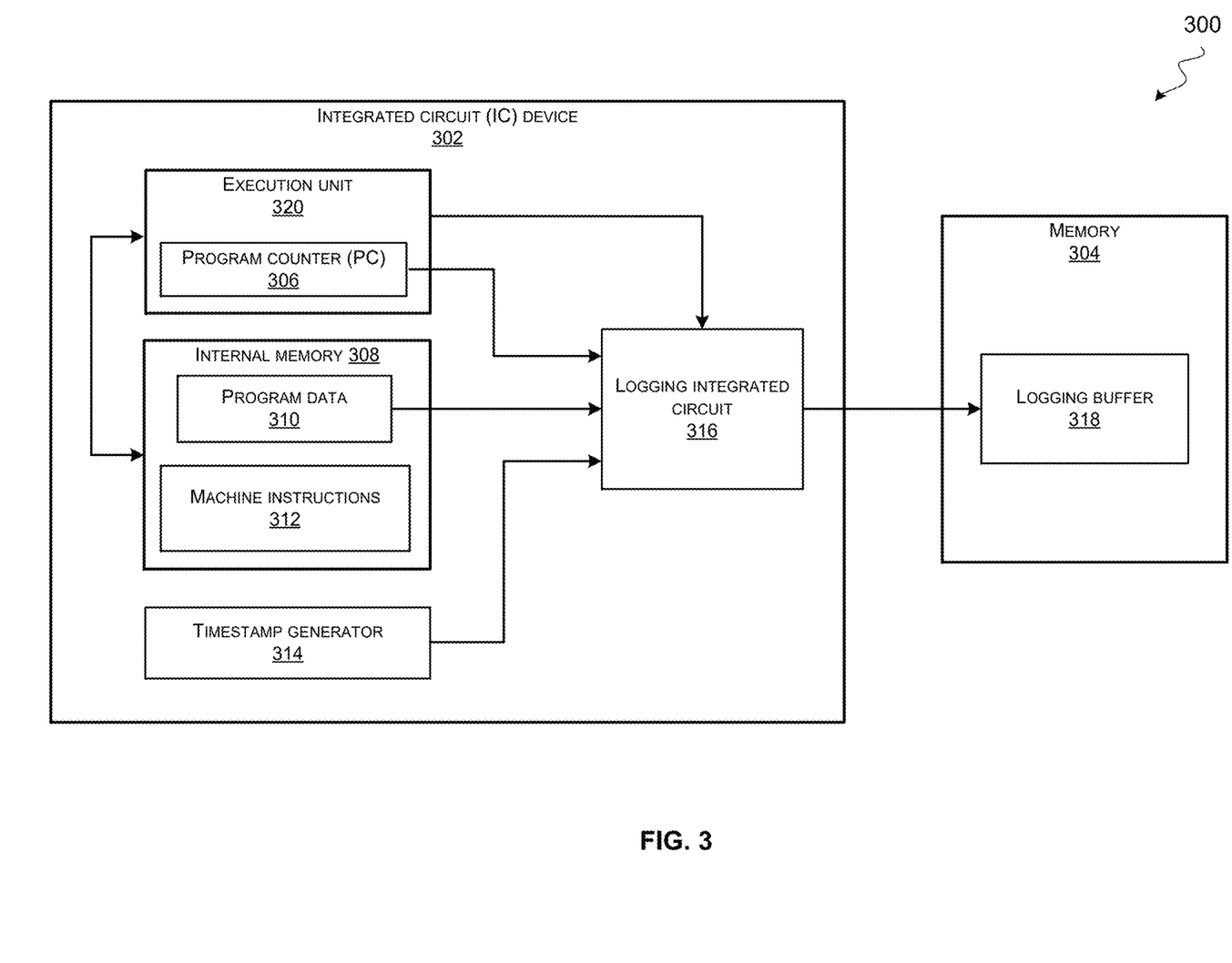
FIG. 3 illustrates an example of a computing device that can support a low overhead logging mechanism, according to some embodiments.

FIG. 3 illustrates an example of a computing device 300 that can support low overhead logging mechanism, according to some embodiments.

The computing device 300 may include an IC device 302 and a memory 304. The memory 304 may be external to the IC device 302, and may include a logging buffer 318. The logging buffer 318 may be an example of the logging buffer 206 in FIG. 2. The IC device 302 may include an execution unit 320 comprising a program counter (PC) 306 that can be used to maintain an instruction pointer for fetching and execution of instructions. In some implementations, the execution unit 320 may be part of a processor (not shown) of the IC device 302. The IC device 302 may also include an internal memory 308, which may be used to store program data 310, and machine instructions 312. The internal memory 308 may include registers, buffers, a random access memory (RAM), or other suitable types of memory. In some embodiments, the logging buffer 318 may be part of the internal memory 308.

The machine instructions 312 may have been compiled from the program code for a program, and include the log machine instructions (e.g., the log instructions 204a and 204b) to store the metadata in the logging buffer 318, as described previously. The program data 310 may include data associated with the program being executed on the IC device 302. In various examples, the program data 310 may include pointer values, computation results, different states, or contents of any register or memory location associated with the program from the execution of the machine instructions 312.

The IC device 302 may also include a timestamp generator 314, which may be operable to generate a timestamp. In some implementations, the timestamp generator 314 may generate a timestamp based on a clock used by the IC device 302, and store the timestamp in a register, which can be used by the logging mechanism.

In some implementations, the IC device 302 may include a dedicated logging integrated circuit 316 to store or copy the metadata in the logging buffer 318. For example, execution of a log instruction from the machine instructions 312 may cause the logging integrated circuit 316 to store the corresponding metadata in the logging buffer 318. The dedicated logic integrated circuit 316 can be a component that is separate from the execution unit of the processor, and/or separate from the processor of the IC device 302. In some embodiments, when the execution unit 320 executes the log instruction, the execution unit 320 may instruct the logging integrated circuit 316 to perform the copy operation. Thus, by offloading the copying of the metadata to the logging integrated circuit 316 by the processor (or the execution unit 320), impact on the program execution time can be minimized. The logging integrated circuit 316 may include suitable components and/or functionality to communicate with the logging buffer 318 to store the metadata.

As an example, the metadata may include the current value of the PC 306, the program data 310 associated with the program, and the current timestamp provided by the timestamp generator 314.

In some implementations, as a program is being executed on the IC device 302, the execution unit 320, or a decoding circuit (not shown) in the IC device 302 may generate a logging enable signal upon execution of a log instruction from the machine instructions 312 at different times, which can trigger the logging integrated circuit 316 to store the corresponding metadata. Referring back to FIG. 2, execution of the log instruction 204a may cause the logging integrated circuit 316 to store the metadata 206a in the logging buffer 318 at the time T1, and execution of the log instruction 204b may cause the logging integrated circuit 316 to store the metadata 206b in the logging buffer 318 at the time T2. In some implementations, the logging integrated circuit 316 may be part of a processor or a CPU, of the IC device 302.

In some implementations, the logging buffer 318 may be mapped to a memory region that is not used by the normal execution of the program. This memory region is not loaded during runtime, and, therefore, does not interfere with the execution of the program. Furthermore, the memory footprint of the metadata stored in the logging buffer 318 may be much smaller as compared to storing the logging strings 210 generated by the post-processor 208. Thus, the relevant information associated with the program can be collected in a single clock cycle for each log instruction without executing separate debug code that may otherwise be expensive, especially for embedded systems.

Figure 4:
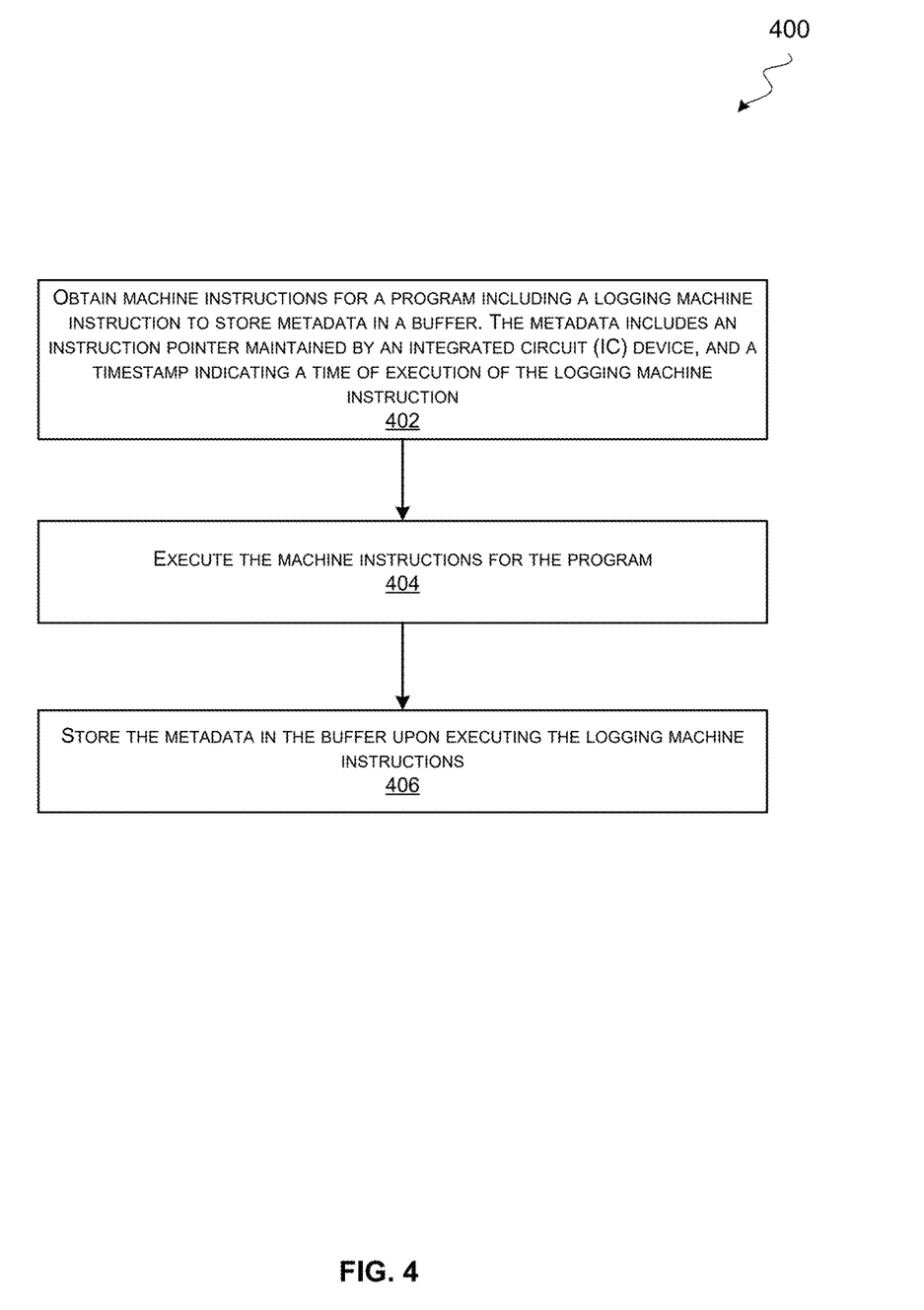
FIG. 4 illustrates an example flowchart for a method performed by the IC device for low-overhead logging, according to some embodiments.

FIG. 4 illustrates an example flowchart 400 for a method performed by an IC device for low overhead logging, according to some embodiments.

In step 402, the method may include obtaining machine instructions for a program including a logging machine instruction to store metadata in a buffer. For example, the machine instructions for the program 204 may be obtained by the IC device 302 that include the log instruction 204a to store the metadata 206a in the logging buffer 206. The metadata 206a may include the value of PC1 indicated by the PC 306, and timestamp T1 generated by the timestamp generator 314 indicating a time of execution of the log instruction 204a. The metadata 206a may further include the data X stored in the program data 310 from the execution of the program 204. The log instruction 204a may be generated by compiling the do-log code 202a for storing the metadata 204a into a single machine instruction.

The code for storing the metadata 206a may be inserted into program code for the program 204 for tracing or debugging of the program. As described with reference to FIG. 2, the code 202a may be inserted before a snippet of the program code and the code 202b may be inserted after the snippet of program code to obtain an execution time for the snippet of program code that gets compiled to the machine instructions between the log instructions 204a and 204b.

In step 404, the method may further include executing the machine instructions for the program. For example, the IC device 302 may execute the machine instructions 312 stored in the internal memory 308. The machine instructions 312 may be executed by the execution unit 320 that maintains the instruction pointer using the PC 306.

In step 406, the method may further include storing the metadata in the buffer upon executing the logging machine instruction. In some implementations, metadata 206a may be stored in the logging buffer 318 by the processor of the IC device 302. In some implementations, execution of the log instruction 204a may cause a dedicated logging integrated circuit 316 to store the metadata 206a in the logging buffer 318.

The post-processor 208 may reconstruct a log message "At time T1: My data is X" based on the program code for the program 204 and the metadata 206a. In some cases, the post-processor 208 may use the reconstructed log message (e.g., value of PC1) to perform offline analysis of the program 204, e.g., for profile guided optimization of the program, or to improve performance. Thus, the techniques described herein can combine the flexibility of programmer-controlled logging with the reduction in size of tokenized logging and the low overhead of tracing by reducing the overhead of logging all the way to a single machine instruction, without any significant impact to the program size or execution time.

Figure 5:
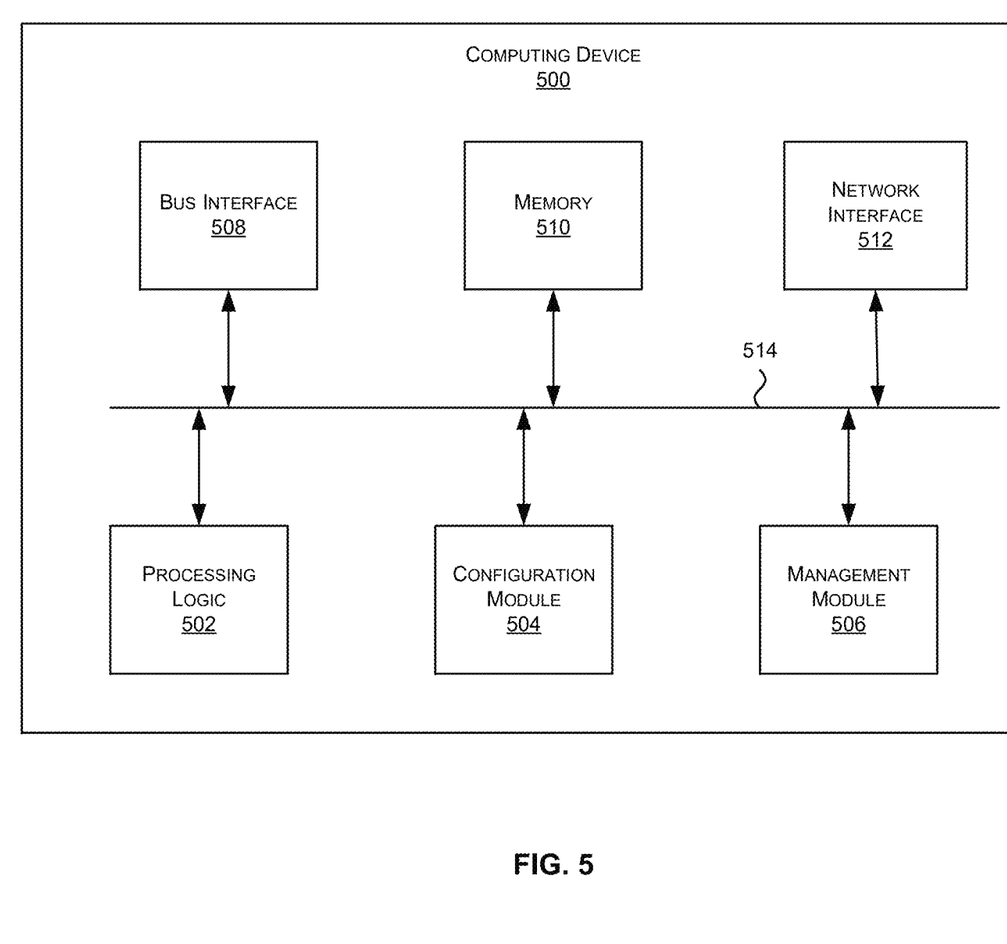
FIG. 5 illustrates an example of a computing device, according to certain aspects of the disclosure.

FIG. 5 illustrates an example of a computing device 500. Functionality and/or several components of the computing device 500 may be used without limitation with other embodiments disclosed elsewhere in this disclosure, without limitations. For example, the computing device 500 may be an example of the computing device 300.

In one example, the computing device 500 may include processing logic 502, a configuration module 504, a management module 506, a bus interface module 508, memory 510, and a network interface module 512. These modules may be hardware modules, software modules, or a combination of hardware and software. In certain instances, modules may be interchangeably used with components or engines, without deviating from the scope of the disclosure. The computing device 500 may include additional modules, which are not illustrated here. In some implementations, the computing device 500 may include fewer modules. In some implementations, one or more of the modules may be combined into one module. One or more of the modules may be in communication with each other over a communication channel 514. The communication channel 514 may include one or more busses, meshes, matrices, fabrics, a combination of these communication channels, or some other suitable communication channel.

The processing logic 502 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 502 may include processors developed by ARM®, MIPS®, AMD®, Intel©, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 502 may be stored on a computer-readable storage medium, for example, in the form of a computer program. The computer-readable storage medium may be non-transitory. In some cases, the computer-readable medium may be part of the memory 510.

The memory 510 may include either volatile or non-volatile, or both volatile and non-volatile types of memory. The memory 510 may, for example, include random access memory (RAM), read only memory (ROM), Electrically Erasable Programmable Read-Only Memory (EEPROM), flash memory, and/or some other suitable storage media. In some cases, some or all of the memory 510 may be internal to the computing device 500, while in other cases some or all of the memory may be external to the computing device 500. The memory 510 may store an operating system comprising executable instructions that, when executed by the processing logic 502, provides the execution environment for executing instructions providing networking functionality for the computing device 500. The memory may also store and maintain several data structures and routing tables for facilitating the functionality of the computing device 500.

In some implementations, the configuration module 504 may include one or more configuration registers. Configuration registers may control the operations of the computing device 500. In some implementations, one or more bits in the configuration register can represent certain capabilities of the computing device 500. Configuration registers may be programmed by instructions executing in the processing logic 502, and/or by an external entity, such as a host device, an operating system executing on a host device, and/or a remote device. The configuration module 504 may further include hardware and/or software that control the operations of the computing device 500.

In some implementations, the management module 506 may be configured to manage different components of the computing device 500. In some cases, the management module 506 may configure one or more bits in one or more configuration registers at power up, to enable or disable certain capabilities of the computing device 500. In certain implementations, the management module 506 may use processing resources from the processing logic 502. In other implementations, the management module 506 may have processing logic similar to the processing logic 502, but segmented away or implemented on a different power plane than the processing logic 502.

The bus interface module 508 may enable communication with external entities, such as a host device and/or other components in a computing system, over an external communication medium. The bus interface module 508 may include a physical interface for connecting to a cable, socket, port, or other connection to the external communication medium. The bus interface module 508 may further include hardware and/or software to manage incoming and outgoing transactions. The bus interface module 508 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 508 may include the physical layer for any of these bus protocols, including a connector, power management, and error handling, among other things. In some implementations, the computing device 500 may include multiple bus interface modules for communicating with multiple external entities. These multiple bus interface modules may implement the same local bus protocol, different local bus protocols, or a combination of the same and different bus protocols.

The network interface module 512 may include hardware and/or software for communicating with a network. This network interface module 512 may, for example, include physical connectors or physical ports for wired connection to a network, and/or antennas for wireless communication to a network. The network interface module 512 may further include hardware and/or software configured to implement a network protocol stack. The network interface module 512 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 500 may include multiple network interface modules, each configured to communicate with a different network. For example, in these implementations, the computing device 500 may include a network interface module for communicating with a wired Ethernet network, a wireless 802.11 network, a cellular network, an Infiniband network, etc.

The various components and modules of the computing device 500, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 5, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
   receiving program code for a program to be executed on an integrated circuit (IC) device, wherein the program code includes code for storing metadata associated with the program in a logging buffer at different times during execution of the program;
   compiling the program code into machine instructions, wherein the code for storing the metadata at each of the different times is compiled into a corresponding single machine instruction, wherein the metadata stored by each single machine instruction includes an instruction pointer maintained by a processor of the IC device, a timestamp indicating a time of execution of the corresponding single machine instruction, and data associated with the program at that time;
   executing, by the IC device, the machine instructions for the program;
   storing, by the IC device, the metadata in the logging buffer at each of the different times upon executing the corresponding single machine instruction; and
   generating, by a post-processor, program logging strings based on the stored metadata and the program code.

2. The method of claim 1, wherein the metadata is stored in the logging buffer by a dedicated logging integrated circuit of the IC device.

3. The method of claim 1, wherein storing the metadata uses a smaller memory footprint in the logging buffer as compared to storing the program logging strings.

4. The method of claim 1, further including:
performing, by the post-processor, offline analysis of the program surrounding the instruction pointer.

5. A method performed by an integrated circuit (IC) device, comprising:
obtaining machine instructions for a program including a logging machine instruction to store metadata in a buffer, the metadata including an instruction pointer maintained by the IC device and a timestamp indicating a time of execution of the logging machine instruction;
executing the machine instructions for the program; and
storing the metadata in the buffer upon executing the logging machine instruction.

6. The method of claim 5, wherein the logging machine instruction is generated by compiling code for storing the metadata into a single machine instruction.

7. The method of claim 6, wherein the code for storing the metadata is inserted into program code for the program for tracing or debugging of the program.

8. The method of claim 7, wherein the code is inserted before a snippet of the program code and after the snippet of the program code to obtain an execution time for the snippet of the program code.

9. The method of claim 5, wherein the metadata further includes data generated by execution of the program.

10. The method of claim 9, wherein the data generated by execution of the program includes contents of a memory location, or contents of a register.

11. The method of claim 5, wherein a post-processor reconstructs a log message based on program code for the program and the stored metadata.

12. The method of claim 11, wherein the reconstructed log message is used to perform offline analysis of the program.

13. The method of claim 5, wherein the metadata is stored in the buffer by a processor of the IC device.

14. The method of claim 5, wherein the execution of the logging machine instruction causes a dedicated logging integrated circuit to store the metadata in the buffer.

15. The method of claim 5, wherein the buffer is an external memory of the IC device.

16. An integrated circuit (IC) device, comprising:
memory operable to store machine instructions compiled from program code for a program, the machine instructions including a logging machine instruction to store metadata in a buffer;
a decoding circuit unit operable to execute the machine instructions for the program using an instruction pointer;
a timestamp register operable to provide a timestamp indicating a time of execution of the logging machine instruction; and
a logging integrated circuit operable to store the metadata in the buffer upon execution of the logging machine instruction, wherein the metadata includes the instruction pointer and the timestamp at the time of execution of the logging machine instruction.

17. The IC device of claim 16, wherein the metadata further includes data generated by execution of the machine instructions for the program.

18. The IC device of claim 16, wherein the metadata is reconstructed into a log message based on the program code for the program.

19. The IC device of claim 16, wherein the buffer is an internal buffer of the IC device.

20. A non-transitory computer readable medium having stored therein instructions that, when executed by one or more processors, cause the one or more processors to execute a compiler, the compiler performing operations comprising:
receiving program code for a program to be executed on an integrated circuit (IC) device, wherein the program code includes code for storing metadata associated with the program in a logging buffer at different times during execution of the program; and
compiling the program code into machine instructions, wherein the code for storing the metadata at each of the different times is compiled into a corresponding logging machine instruction, wherein the metadata stored by each logging machine instruction includes an instruction pointer maintained by a processor of the IC device, and a timestamp indicating a time of execution of the corresponding single machine instruction.

* * * * *